US008486568B2

(12) United States Patent
Sanada et al.

(10) Patent No.: US 8,486,568 B2
(45) Date of Patent: Jul. 16, 2013

(54) PREPARATION PROCESS OF ALL-SOLID BATTERY

(75) Inventors: Masakazu Sanada, Kyoto (JP); Takeshi Matsuda, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 0 days.

(21) Appl. No.: 13/572,255

(22) Filed: Aug. 10, 2012

(65) Prior Publication Data

US 2013/0042467 A1    Feb. 21, 2013

(30) Foreign Application Priority Data

Aug. 18, 2011   (JP) .................................. 2011-178697

(51) Int. Cl.
*H01M 6/24*  (2006.01)
(52) U.S. Cl.
USPC .......................................... 429/309; 429/233
(58) Field of Classification Search
None
See application file for complete search history.

(56) References Cited

U.S. PATENT DOCUMENTS

| 5,063,081 | A  | * | 11/1991 | Cozzette et al. ................ 435/4 |
| 7,078,124 | B2 | * | 7/2006  | Kim et al. ...................... 429/137 |
| 7,592,540 | B2 | * | 9/2009  | Park et al. ...................... 136/263 |
| 2005/0042515 | A1 | * | 2/2005 | Hwang et al. ............ 429/231.95 |
| 2007/0015060 | A1 | * | 1/2007 | Klaassen ...................... 429/309 |
| 2011/0070479 | A1 |   | 3/2011  | Matsuda et al. |

FOREIGN PATENT DOCUMENTS

JP          2011-70788          4/2011

* cited by examiner

*Primary Examiner* — Patrick Ryan
*Assistant Examiner* — Jose Colucci Rios
(74) *Attorney, Agent, or Firm* — Ostrolenk Faber LLP

(57) ABSTRACT

Preparation process of an all-solid battery, comprising forming a linear active material part by relatively moving a first nozzle which discharges active material linearly with respect to a current collector to form a plurality of linear active material parts on the current collector, forming a first electrolyte layer by relatively moving a second nozzle which discharges first electrolyte material with respect to the current collector to apply first electrolyte material to each of the plurality of linear active material parts to form linear electrolyte parts thereon to thereby prepare linear active material-electrolyte parts, photo-curing by irradiating light to the linear electrolyte parts to cure them, and forming a second electrolyte layer by applying second electrolyte material to the whole of the linear active material-electrolyte parts and spaces on the current collector between the linear active material-electrolyte parts to prepare the second electrolyte layer.

4 Claims, 8 Drawing Sheets

(a)

(b)

(a)

(b)

PREPARATION PROCESS OF ALL-SOLID BATTERY

BACKGROUND OF THE INVENTION

1. Field of the Invention

The present invention relates to a process for preparing an all-solid battery such as a lithium ion secondary battery.

2. Description of the Related Art

Lithium ion secondary batteries are composed of a positive electrode, negative electrode, an electrolyte (solid electrolyte) and a separator etc. have a light weight, a large capacity and high charge-discharge performance, and are widely used in fields of mobile devices such as laptop computer and cellular phone and field of automobiles. Various studies have been done for establishing larger capacity and higher charge-discharge performance.

The rate determining factor to enlarge the capacity and to enhance the charge-discharge performance is a rate of reaction of an electrolyte with a positive electrode active material contained in the positive electrode and a negative electrode active material contained in the negative electrode. However, because a lithium ion conductivity of the electrolyte is low, it is important to make a distance between the positive electrode and the negative electrode shorter, and to increase areas of the positive and negative electrodes as large as possible, especially to enlarge contact areas of the electrolyte with the positive and negative electrode active materials.

Considering this viewpoint, for example, JP2011-70788 A proposes, in order to present an all-solid battery to achieve low cost, high safety, high energy density-high performance, a process for preparing an all-solid battery which includes three-dimensional electrodes containing active materials of concavo-convex structure.

Namely, in JP2011-70788 A (claim 1, etc.), there is proposed a process for preparing an all-solid battery which includes a first active material layer forming step by forming the first active material layer having a given concavo-convex pattern by applying a coating liquid containing a first active material to a substrate, after the first active material layer forming step, a solid electrolyte layer forming step by applying a coating liquid containing a polymer electrolyte on the integrated substrate in which the first active material layer is integrated on the surface of the substrate to form a solid electrolyte layer having convexity and concavity almost along with the concavo-convex pattern on the integrated substrate, and, after the solid electrolyte layer forming step, a second active material layer forming step by applying a coating liquid containing a second active material to the surface of the solid electrolyte layer to form a second active material layer having an almost flat surface on the opposite side to the side which contacts with the solid electrolyte layer.

Generally when preparing a conventional lithium ion secondary battery by using a solid (polymer) electrolyte, at first, a negative electrode active material or a positive electrode active material is applied to a current collector, and then is sufficiently dried under vacuum at around 90☐ for about 5 hours. After that, a precursor layer of an electrolyte containing a polymeric electrolyte monomer and a lithium salt is formed thereon, and then is dried and polymerized by heating at around 100☐ to form a gel-like electrolyte film. Consequently, an active material which forms a counter electrode is applied and dried to form a current collector, and then a lithium ion secondary battery is fabricated.

According to the conventional fabrication process of lithium ion secondary batteries, since the polymerization of the polymeric electrolyte monomer is conducted on the almost flat surface of the active material layer, even if the monomer may be fluidized during the polymerization reaction with heating, an almost homogeneous solid electrolyte layer having a flat surface can be obtained after cooling, thus there is no particular problem.

According to the technique proposed in JP2011-70788 A, a solid electrolyte layer having a high aspect ratio can be prepared. However, since the solid electrolyte layer has to be formed on the surface of the first active material layer having the concavo-convex pattern, even if the precursor film is formed along with the concavo-convex pattern of the first active material layer, there is a case that a solid electrolyte layer having a low aspect ratio is prepared, because the electrolyte is fluidized at the polymerization with heating due to its thermoplastic property to flow into the concave portions, followed by solidified as it is to form a solid electrolyte layer. In such a case, since the contact area between the obtained solid electrolyte layer and the second active material layer is lowered, there is a problem that the battery performances such as large capacity and high charge-discharge ability are sacrificed.

The object of the present invention is to provide a process for preparing a solid electrolyte layer having a high aspect ratio through simple process steps, and to give an all-solid battery such as lithium ion secondary battery being excellent in large capacity and high charge-discharge performance.

SUMMARY OF THE INVENTION

The present invention relates to a process for preparing an all-solid battery, comprising
a step for forming a linear active material part by relatively moving a first nozzle which discharges an active material linearly with respect to a current collector to form a plural of linear active material parts on the current collector,
a step for forming a first electrolyte layer by relatively moving a second nozzle which discharges a first electrolyte material with respect to the current collector to apply the first electrolyte material to each of the plural linear active material parts to from a linear electrolyte part thereon to prepare linear active material-electrolyte parts,
a step for photo-curing by irradiating light to the linear electrolyte parts to cure, and
a step for forming a second electrolyte layer by applying a second electrolyte material to the whole of the linear active material-electrolyte part and spaces on the current collector between the linear active material-electrolyte parts to prepare a second electrolyte layer.

According to the process for preparing the all-solid battery of the present invention, the all-solid battery having the solid electrolyte layer which is composed of the first electrolyte layer and the second electrolyte layer by forming the linear electrolyte part on each of the linear active material part, curing the linear electrolyte part by irradiation of light, and then forming the second electrolyte layer which covers the whole of the surface of the linear active material-electrolyte part and the space between the linear active material-electrolyte parts. Therefore, according to the present invention, since a solid electrolyte layer having a high aspect ratio can surely be prepared even through exothermic polymerization reaction, the all-solid battery having excellent battery performances such as large capacity and high charge-discharge ability can be obtained without diminishing the contact area with a second active material layer.

In the process for preparing the all-solid battery of the present invention, it is preferable that the step for photocuring is carried out while conducting the step for forming the first electrolyte layer.

According to the process for preparing the all-solid battery of the present invention in this manner, the production period of time can be shortened by carrying out the step for photocuring and the step for forming the first electrolyte layer simultaneously.

In the process for preparing the all-solid battery of the present invention, the compositions of the first electrolyte material and the second electrolyte material may be the same or different, and preferably are the same.

According to the process for preparing the all-solid battery of the present invention in this manner, since it is not necessary to prepare a second electrolyte material separately in addition to the first electrolyte material, the production process can be simplified.

In the process for preparing the all-solid battery of the present invention, it is preferable that the step for forming the second electrolyte layer is carried out by spray method or spin-coat method.

According to the process for preparing the all-solid battery of the present invention in this manner, the solid electrolyte layer which covers the whole of the surface of the linear active material-electrolyte part and the space between the linear active material-electrolyte parts on the current collector can surely be formed through simple process steps.

The present invention can provide a process for preparing a solid electrolyte layer having a high aspect ratio through simple process steps, and to give an all-solid battery such as lithium ion secondary battery being excellent in large capacity and high charge-discharge performance.

DETAILED DESCRIPTION OF THE INVENTION

In the following, embodiments according to the preparation process of the all-solid battery of the present invention are explained by referring drawings. In the following explanation, the same symbol designates the same or corresponding part, and in some cases, overlapped explanation may be omitted. With respect to the drawings, since drawing is used for explaining the concept of the present invention and for assisting understanding, there is a case that the illustrated size, ratio or number is overdrawn or simplified.

Figure 1:
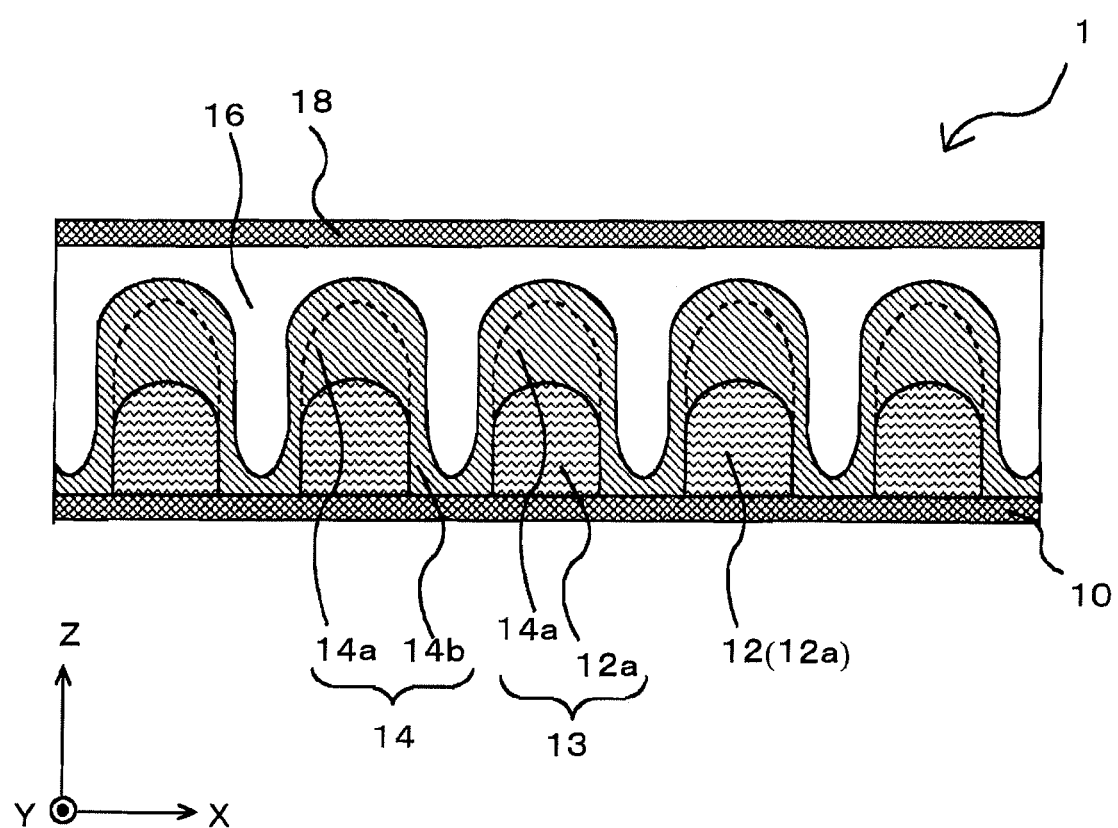
FIG. 1 is a schematic vertical sectional view showing a lithium ion secondary battery produced according to an embodiment of the present invention.
Figure 2:
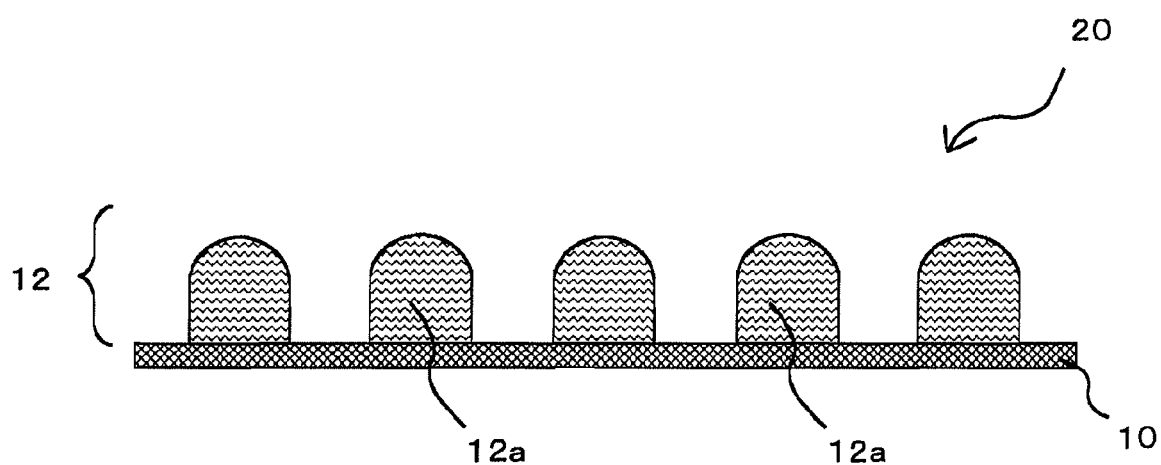
FIG. 2 is a schematic vertical sectional view showing a structure (negative electrode) 20 where a plural of linear negative electrode active material parts 12 made of the negative electrode active material are formed on the surface of the negative electrode current collector 10 according to an embodiment of the present invention.

The present invention is explained according to an embodiment where a lithium ion secondary battery shown in FIG. 1 is prepared. FIG. 1 is a schematic vertical sectional view showing a lithium ion secondary battery produced according to this embodiment of the present invention. And FIG. 2 is a schematic vertical sectional view showing a structure (negative electrode) 20 where a plural of linear negative electrode active material parts 12a made of the negative electrode active material are formed on the surface of the negative electrode current collector 10 according to an embodiment of the present invention.

The lithium ion secondary battery 1 according to the embodiment has a structure fabricated by integrating a negative electrode active material layer 12 composed of a plural of linear negative electrode active material part 12a, a solid electrolyte layer 14, a positive electrode active material layer 16 and a positive electrode current collector 18 on a negative electrode current collector in this order. A negative electrode is composed of the negative electrode current collector 10 and the negative electrode active material layer 12, and the solid electrolyte layer 14 is composed of a linear electrolyte part 14a and a secondary electrolyte layer 14b.

Figure 4:
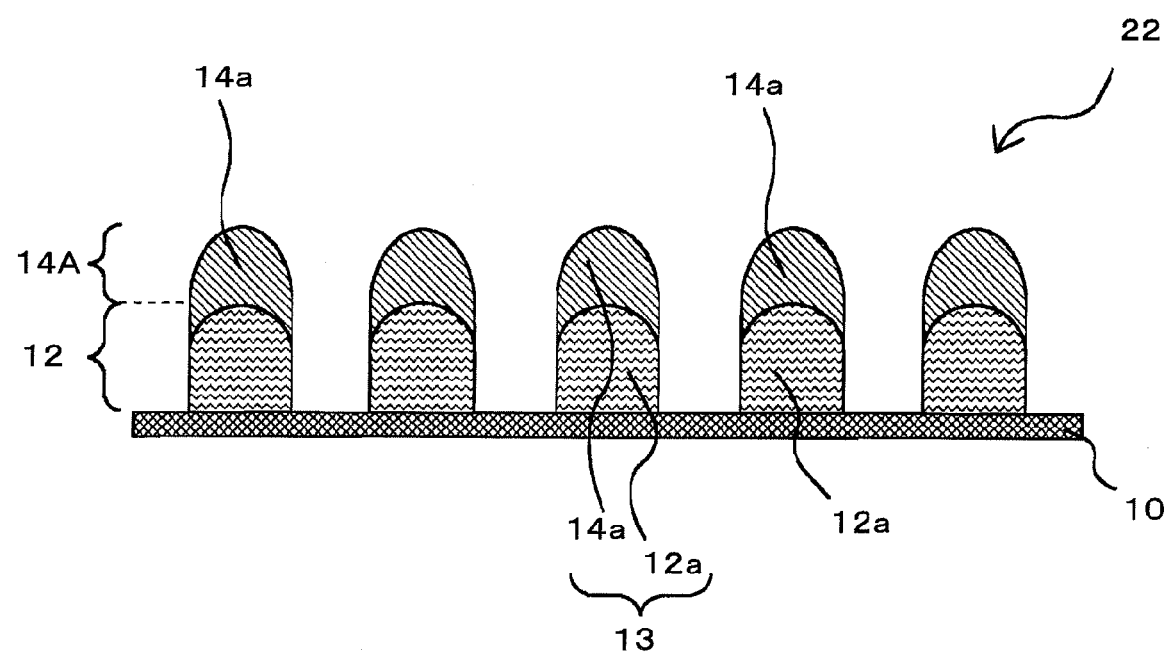
FIG. 4 is a schematic vertical sectional view showing the structure 22 of the active material-electrolyte part 13 where the linear electrolyte part 14a is formed on the negative electrode active material layer 12 composed of a plural of the negative electrode active material parts provided on the negative electrode current collector 10 according to an embodiment of the present invention.

The linear first electrolyte part 14a is formed on each of a plural of the linear negative electrode active material part 12a which composes the negative electrode active material layer 12. The second electrolyte layer 14b is formed in such a manner as to cover the whole of the linear negative electrode-active material part 13 composed of the linear negative electrode active material part 12a and the linear first electrolyte part 14a (see FIG. 4) and the exposed surface area on the negative electrode current collector 10. The linear first electrolyte part 14a and the second electrolyte layer 14b compose the solid electrolyte layer 14. A positive electrode active material layer 16 and a positive electrode current collector 18 compose a positive electrode. In the explanation, the directions of X axis, Y axis and Z axis of coordinate are defined in the respective Figures. As shown in FIG. 4, a plural of the linear first electrolyte parts 14a compose the first electrolyte layer 14A when viewing in the direction parallel to the surface of the negative electrode current collector 10.

The negative electrode current collector 10 on which a plural of the linear negative electrode active material parts 12a are formed may be made of known materials used in this technical field and examples thereof may be metal films such as an aluminum foil. The negative electrode current collector 10 may be formed on a surface of an electrically insulating substrate (not shown). The substrate may be a flat plate of an electrically insulating material, and examples thereof include a resin, glass, or ceramics, and the like. Further, the substrate may be a flexible plate.

The negative electrode active material layer 12 is composed of, as shown in FIG. 1 (and FIG. 3), a plural of the linear first active material parts 12 which elongate in the direction to the Y axis on the negative electrode current collector 10. The negative electrode active material contained in the negative electrode active material layer 12 may be known materials used in this technical field, and examples thereof include metals, metal fibers, carbon materials, oxides, nitrides, silicon, silicon compounds, tin, tin compounds, various metal alloys, and the like. Among them, from viewpoint of large capacity density, preferable are oxides, carbon materials, silicon, silicon compounds, tin, tin compounds, and the like. Examples of the oxides include lithium titanates represented by the formula: $Li_{4/3}Ti_{5/3-x}Fe_xO_4$ ($0 \leq x \leq 0.2$), and the like. Examples of the carbon materials include various natural graphite, cokes, semi-graphitized carbons, carbon fibers, spherical carbons, various artificial graphite, amorphous carbons, and the like. As the silicon compounds, there are silicon-containing alloys, silicon-containing inorganic compounds, silicon-containing organic compounds, solid solutions, and the like. Examples of the silicon compounds include silicon compounds represented by $SiO_a$ ($0.05<a<1.95$); silicon alloys with at least one element selected from Fe, Co, Sb, Bi, Pb, Ni, Cu, Zn, Ge, In, Sn and Ti; silicon; silicon oxides; silicon compounds or silicon alloys where a part of silicon atoms is replaced by at least one element selected from B, Mg, Ni, Ti, Mo, Co, Ca, Cr, Cu, Fe, Mn, Nb, Ta, V, W, Zn, C, N and Sn; and solid solutions thereof. Examples of the tin compounds include $SnO_b$ ($0<b<2$), $SnO_2$, $SnSiO_3$, $Ni_2Sn_4$, $Mg_2Sn$, and the like. The negative electrode active material may be used alone and, occasion demands, may be used in combination of two or more.

The negative electrode active material layer 12 may contain an electrically conductive aid. The electrically conductive aid may be known materials used in this technical field, and examples thereof include graphites such as natural graphite and artificial graphite; carbon blacks such as acetylene black, Ketjen black, channel black, furnace black, lump black and thermal black; electrically conductive fibers such as carbon fibers and metal fibers; fluorinated carbons; metal powders such as aluminum; electrically conductive whiskers such as zinc oxide; electrically conductive metal oxides such as titanium oxide; electrically conductive organic compounds such as phenylene derivatives; and the like. The electrically conductive aids may be used alone and, occasion demands, may be used in combination of two or more.

On the upper portions of a plural of the linear negative electrode active material parts 12a which compose the negative electrode active material layer 12, the second electrolyte layer 14b is formed, as shown in FIG. 1, so as to cover a plural of the linear negative electrode active material-electrolyte parts 13 which is composed of the linear negative electrode active material part 12a and the linear electrolyte part 14a. The solid electrolyte layer 14 is composed of the second electrolyte layer 14b and the linear electrolyte layer 14a.

The high aspect ratio of the solid electrolyte layer 14 can be achieved by the linear electrolyte part 14a. The almost of all of the negative electrode active material layer 12 and the linear electrolyte part 14a are covered uniformly with the second electrolyte layer 14b so as to follow the profile, i.e. concavity and convexity of the negative electrode active material layer 12. Accordingly the surface of the solid electrolyte layer 14 has also concavo-convex profile.

The solid electrolyte contained in the solid electrolyte layer 14 may be polymer electrolytes such as polyethylene resin or polystyrene resin. Examples of supporting electrolytes include lithium salts such as lithium hexafluorophosphate ($LiPF_6$), lithium perchlorate ($LiClO_4$), and lithium bis(trifluoromethanesulfonyl)imido (LiTFSI). A boric acid ester polymer electrolyte may also be used.

In this embodiment, as explained herein below, the first electrolyte material and the second electrolyte material used for forming the linear electrolyte part 14a and the second electrolyte layer 14b which compose the solid electrolyte layer 14 contain a photocurable resin. Of course, any other additives may be admixed unless the effects of the present invention are impaired.

The positive electrode active material layer 16 is provided on the upper portion of the solid electrolyte layer 14, as shown in FIG. 1. The positive electrode active material layer 16 has a lower surface having a concavo-convex profile along with the concavo-convex profile of the upper surface of the solid electrolyte layer 14, and an upper surface with an almost flat profile.

Examples of the positive electrode active material (powder) contained in the positive electrode active material layer 16 include lithium-containing composite metal oxides, chalcogen compounds, manganese dioxide, and the like. The lithium-containing composite metal oxide is a metal oxide containing lithium and a transition metal, or a metal oxide where a part of the transition metals of the metal oxide is replaced with a hetero element. Examples of the hetero element include Na, Mg, Sc, Y, Mn, Fe, Co, Ni, Cu, Zn, Al, Cr, Pb, Sb, B, and the like, and preferably are Mn, Al, Co, Ni, Mg, and the like. The hetero element may be single or two or more. Among them, the lithium-containing composite metal oxide is preferably used. The lithium-containing composite metal oxide may be $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (in each chemical formula, M may be at least one selected from Na, Mg, Sc, Y, Mn, Fe, Co, Ni, Cu, Zn, Al, Cr, Pb, Sb, V and B; $0<x\leq1.2$, $0<y\leq0.9$, $LiMeO_2$ (where Me=MxMyMz; Me and M are transition metal, x+y+z=1), and the like. Examples of the lithium-containing composite metal oxide include $LiNi_{1/3}Mn_{1/3}CO_{1/3}O_2$, $LiNi_{0.8}Co_{0.15}Al_{0.05}O_2$, and the like. Here, in the aforementioned formulae, the value x which represents a molar ratio of lithium varies with charging and discharging. Examples of the chalcogen compounds include titanium disulfide, molybdenum disulfide, and the like. The positive electrode active material may be used alone or in combination of two or more. To the positive electrode active material 16, the aforementioned electrically conductive aids explained in the negative electrode active material layer 12 may be added.

A lithium ion secondary battery 1 can be fabricated by integrating the positive electrode current collector 18 on the almost flat upper surface of the positive electrode active material layer 16. The positive electrode current collector 18 may be known materials used in this technical field, and examples thereof include metal foils such as copper foil. The positive electrode current collector 10 may be formed on a surface of an electrically insulating substrate (not shown). The substrate may be a flat plate of an electrically insulating material, and examples thereof include a resin, glass, or ceramics, and the like. Further, the substrate may be a flexible plate.

The lithium ion secondary battery 1 may have a tab electrode (not shown), and a plural of the lithium ion secondary batteries 1 may connected in series or in parallel to provide a lithium ion secondary battery device.

The lithium ion secondary battery according to the embodiment having those structures is thin and can be bent easily. Since the surface area to volume of the negative electrode active material layer 12 is made larger by forming the steric structure of the negative electrode active material layer 12 in the manner of concavo-convex profile as shown in the drawings, a face-to-face area to the positive electrode active material layer 16 via the thin solid electrolyte layer 14 can be made larger, which results in high efficiency and high power. As explained, the lithium ion secondary battery 1 according to the embodiment is small and has high performance.

The process for preparing the electrode and the lithium ion secondary battery 1 according to the above embodiment is explained herein below. When preparing the lithium ion secondary battery 1 according to the above embodiment, the negative electrode is prepared by forming the negative electrode active material layer 12 composed of a plural of the linear negative electrode active material parts 12a on the negative electrode current collector 10, the linear electrolyte part 14a is formed on the upper surface of each linear negative electrode active material parts 12a, after photo-curing the linear electrolyte part 14a, and the second electrolyte layer 14b is formed by applying the second electrolyte material to the whole of the linear negative electrode-active material part 13 composed of the linear negative electrode active material part 12a and the linear first electrolyte part 14a and the exposed surface area on the negative electrode current collector 10.

(1) Step for Forming Linear Negative Electrode Active Material Parts (Negative Electrode Active Material Layer)

The process of preparing the negative electrode active material layer 12 according to this embodiment is explained herein below. The negative electrode active material layer 12 according to this embodiment is prepared by relatively moving the first nozzle which discharges an active material linearly with respect to the negative electrode current collector 10 to form a plural of the linear active material parts 12a on the negative electrode current collector 10. Thereby, as shown in FIG. 2, the structure (negative electrode) 20 which is composed of the negative electrode active material layer 12 which includes a plural of the linear negative electrode active material parts 12a made of the negative electrode active material formed on the surface of the negative electrode current collector 10.

Figure 3:
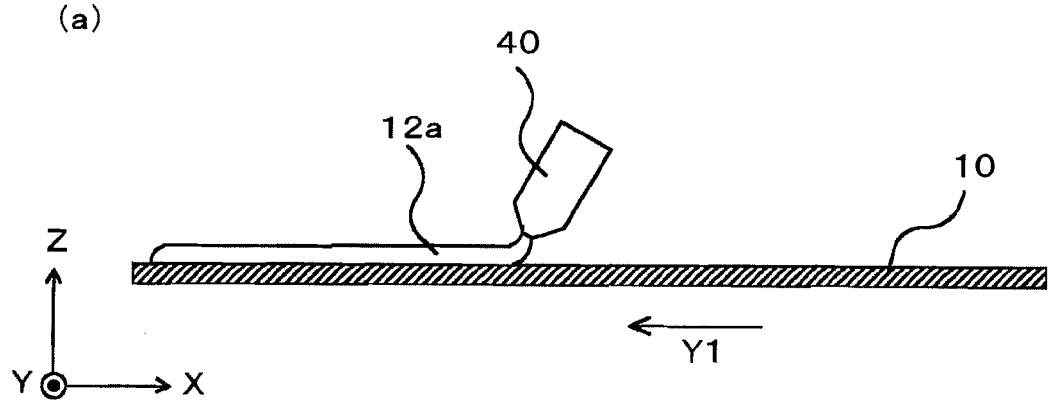
FIG. 3 is a diagrammatic view showing a manner that the negative electrode active material layer 12 composed of a plural of the linear negative electrode active material parts is formed by nozzle dispense method according to an embodiment of the present invention.
Figure 3:
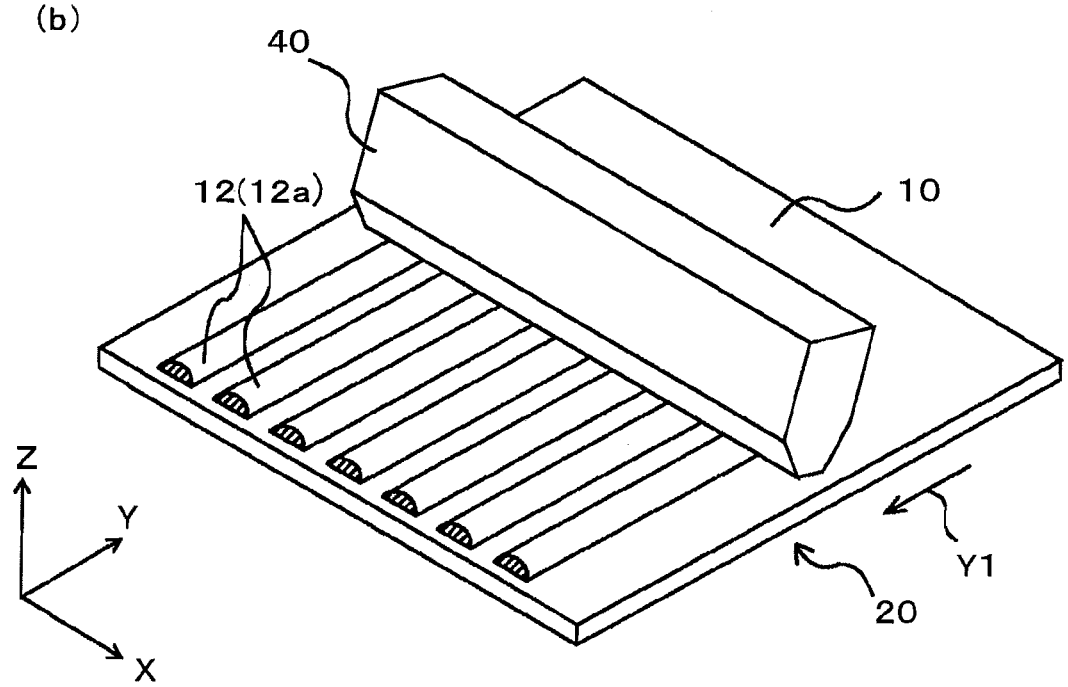

As shown in FIG. 3, for example, by the sheet-like negative electrode current collector 10 is transported in the direction of the allow $Y_1$ with transporting rolls (not shown), the first nozzle 40 is moved relatively with respect to the negative electrode current collector 10 (accordingly the rolls are to say scanning means).

The paste-like negative electrode active material is discharged from the first nozzle 40 with an interval on the surface of the negative electrode current collector 10 while transporting to form a plural of the negative electrode active material parts 12a. In this embodiment, the first nozzle 40 is fixed, and thus the first nozzle 40 is moved relatively with respect to the negative electrode current collector 10 by transporting the negative electrode current collector 10.

The paste-like negative electrode active material is a mixture prepared by kneading the negative electrode active material, the electrically conductive aid, a binder, a solvent, and the like in the usual manner. A viscosity of the paste-like negative electrode active material can be regulated so as to discharge from the first nozzle 40, and is preferably at least approximately 10 Pa·s, and at most approximately 10000 Pa·s under a shear rate of $1\ s^{-1}$. Any of the components may be dissolved or dispersed in the solvent (including partial dissolution or dispersion).

A solid content of the negative electrode active material used in the step for forming the negative electrode active material layer can be regulated so as to discharge from the first nozzle 40. The viscosity and solid content are varied with kinds and proportions of the negative electrode active material, electrically conductive aid, binder, solvent, and a desired size and shape, and can be regulated by a period of time of kneading when the negative electrode active material, electrically conductive aid, binder, and solvent are kneaded in the usual manner.

The binder may be known materials used in this technical field, and examples thereof include poly(vinylidene fluoride) (PVDF), polytetrafluoroethylene (PTFE), polyethylene, polypropylene, aramid resin, polyamide, polyimide, plyamideimide, polyacrylonitrile, poly(acrylic acid), poly(methyl acrylate), poly(ethyl acrylate), poly(hexyl acrylate), poly (methacrylic acid), poly(methyl methacrylate), poly(ethyl methacrylate), poly(hexyl methacrylate), poly(vinyl acetate), poly(vinyl pyrrolidone), polyether, polyethersulfone, polyhexafluoroprolylene, styrene-butadiene rubber, ethylene-propylene diene copolymer, carboxymethylcellulose, and the like. In addition, there may be used, as the binder, copolymers of monomers selected from tetrafluoroethylene, hexafluoropropylene, perfluoro(alkyl vinyl ether), vinylidene fluoride, chlorotrifluoroethylene, ethylene, propylene, pentafluoropropylene, fluoromethyl vinyl ether, acrylic acid, hexadiene, and the like. The binder may be used alone and, occasion demands, may be used in combination of two or more.

The solvent is preferably an organic solvent expecting water on order to avoid decomposition of hexafluorophosphate ($LiPF_6$) and the like which compose the solid electrolyte layer 14. The solvent may be known solvents used in this technical field, and examples thereof include dimethylformamide, dimethylacetoamide, methylformamide, N-methyl-2-pyrrolidone (NMP), dimethylamine, acetone, cyclohexane, and the like. The solvent may be used alone and, occasion demands, may be used in combination of two or more.

FIG. 3(*a*) is a diagrammatic side view to show the manner that a plural of the linear (convex) negative electrode active material parts 12a which compose the negative electrode active material layer 12 (that is, a view in the direction being parallel to the main surface of the transporting negative electrode current collector 10). FIG. 3(*b*) is a diagrammatic perspective view to show the manner that a plural of the linear negative electrode active material parts 12a which compose the negative electrode active material layer 12.

According to the nozzle dispense method, providing the first nozzle 40 which has a plural of discharging nozzles to discharge the coating liquid of the negative electrode active material above the negative electrode current collector 10, the negative electrode current collector 10 is moved in relative to the first nozzle 40 in the direction of the allow $Y^1$ at a constant speed, while discharging a given amount of the negative electrode active material. As a result, on the negative electrode current collector 10, a plural of the negative electrode active material parts 12a made of the negative electrode active material are applied and formed along with the direction of Y in such a pattern as stripe.

When providing a plural of the discharging nozzles with the first nozzle 40, a plural of the linear negative electrode active material parts 12a are formed in the pattern of stripe, and when continuing the transportation of the negative electrode current collector 10, the stripe-like linear negative electrode active material parts 12a can be formed all over the surface of the negative electrode current collector 10.

At this stage, the negative electrode active material layer 12 is a green layer containing the solvent. Therefore, if necessary, the negative electrode current collector 10 where the negative electrode active material layer 12 is provided thereon may be transported so as to pass through the downstream region with a drying means such as a blower, and may be subjected to a drying step by a dry air. Through the drying step, or not through the drying step, the structure 20 shown in FIG. 2 (a structure including the negative electrode current collector 10, the negative electrode active material layer 12 formed on the surface of the negative electrode current collector 10).

A drying temperature in the drying step may be a temperature range so as to dry and fix the negative electrode active material layer 12 temporally, and preferably within a range of 5 to 50☐, more preferably a normal temperature (23☐) to 50☐. The period of drying in the drying step can be controlled by regulating the transporting speed of the negative electrode current collector 10.

(2) Step for Forming a First Electrolyte Layer

As mentioned above, the second nozzle 50 which discharges linearly a first electrolyte material with respect to the negative electrode current collector 10 where the negative electrode active material layer 12 are formed, and then the linear negative electrode electrolyte part 14a is formed on each of the plural of linear negative electrode active material parts 12a which compose the negative electrode active material layer 12.

Thereby, as shown in FIG. 4, the linear electrolyte part 14a is formed on the linear negative electrode active material parts 12a which compose the negative electrode active material layer 12 formed on the negative electrode current collector 10, which forms the structure 22 including the linear negative electrode active material-electrolyte part 13.

Figure 5:
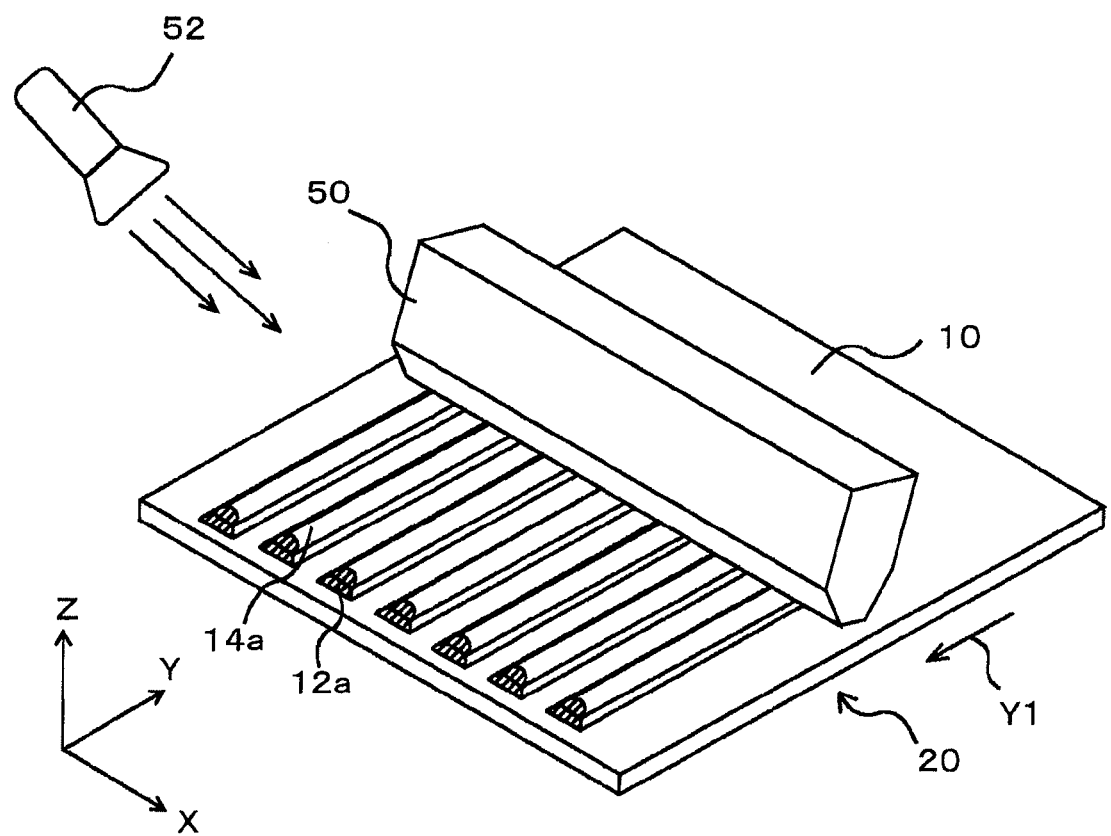
FIG. 5 is a diagrammatic view showing a manner that the linear electrolyte part 14a is cured by irradiation of light while forming the linear electrolyte part 14a on the linear negative electrode active material part 12 by nozzle dispense method according to an embodiment of the present invention.

The linear electrolyte part 14a can be prepared in the same manner as in the preparation of a plural of the linear negative electrode active material parts 12a which compose the negative electrode active material layer 12, as shown in FIG. 5, according to the nozzle dispense method by using the nozzle 50. The first electrolyte material contains the solid electrolyte monomer, supporting electrolyte, photocurable resin. The composition of the first electrolyte material may be optionally varied unless the effects of the invention are impaired.

The "photocurable resin" means an organic compound which can be cured by irradiation of electromagnetic wave such as ultraviolet ray and/or blue ray, and is a concept including a conventional photosensitive organic compound, for example, photocurable monomer and/or photocurable resin.

The photocurable monomer and photocurable resin are, for example, a mono-functional or poly-functional ultraviolet ray polymerizable (crosslinkable) organic compound, and the like which has at least one or two of ultraviolet curable carbon-carbon double bond (e.g. ethylenic unsaturated double bond) to form a three dimensional network. The photocurable compound may be used alone and may be used in combination of two or more.

Among the photocurable compounds, there can be preferably used an ultraviolet curable monomer having acryloyl or methacryloyl group (acrylate compound or methacrylate compound). Examples of the mono-functional acrylate compound or methacrylate compound include dicyclopentenyloxyethyl acrylate, allyl acrylate, 2-phenoxyethyl acrylate, benzyl acrylate, butoxyethyl acrylate, botoxyethylene glycol acrylate, cyclohexyl acrylate, dicyclopentanyl acrylate, 2-ethylhexyl acrylate, glycerol acrylate, glycidyl acrylate, 2-hydroxyethyl acrylate, 2-hydroxypropyl acrylate, isobornyl acrylate, isooctyl acrylate, isostearyl acrylate, lauryl acrylate, 2-methoxy acrylate, methoxyethylene glycol acrylate, phenoxyethyl acrylate, stearyl acrylate, tetrahydrofurfuryl acrylate, ethoxylated o-phenylphenol acrylate, dicyclopentenyl acrylate, 2-(2-vinyloxyethoxy)ethyl acryalte, phenoxypolyethylen glycol acrylate, 4-hydroxybutyl acrylate, cyclic trimethylolpropane fromal acrylate, 3,3,5-trimethylcyclohexane acrylate, and methacrylate compounds where the aforementioned acrylates are replaced by methacrylates, or the like.

Examples of the two or more functional. i.e. poly-functional acrylate compound or methacrylate compound include 1,3-butylene diol diacrylate, neopentyl glycol diacrylate, dipropylene glycol diacrylate, ethylene glycol diacrylate, diethylene glycol diacrylate, 1,9-nonan diol diacrylate, 1,4-butane diol diacrylate, 1,5-pentane diol diacrylate, 1,6-hexane diol diacrylate, 1,3-propane diol diacrylate, 1,4-cyclohexane diol diacrylate, 2,2-dimethylolpropane diacrylate, glycerol diacrylate, tripropylene glycol diacrylate, pentaerythritol triacrylate, pentaerythritol tetraacrylate, glycerol triacrylate, ethyleneoxide-modified pentaerythritol tetraacrylate, dioxane glycol diacrylate, propyleneoxide-modified pentaerythritol triacrylate, triethyleneglycol diacrylate, polyoxypropyl trimethylolpropane triacrylate, butylene glycol diacrylate, tricyclodecanedimethanol diacrylate, 1,2,4-butane triol triacrylate, 2,2,4-trimethyl-1,3-pentane diol diacrylate, trimethylolpropane triacrylate, 1,10-decane diol diacrylate, polypropylene glycol diacrylate, neopentylglycol hydroroxypivalic acid ester diacrylate, ditrimethylolpropane tetraacrylate, dipentaerythritol hydroxypentaacrylate, pentaerythritol hexaacrylate, dipentaerythritol hexaacrylate, and methacrylate compounds where the aforementioned acrylates are replaced by methacrylates, or the like.

(3) Photocuring Step

In this embodiment, as shown in FIG. 5, while carrying out the linear negative electrode active, material-electrolyte part forming step, the linear electrolyte parts 14a is once cured by irradiating a light from a light irradiation device 52 to the linear electrolyte part 14a just after discharging from the second nozzle 50.

As the light irradiation device 52, there may be employed, for example, a UV irradiation device, and the like according to kind of photocurable resins. A person skilled in the art can optionally regulate an irradiation period and dose of light according to kind and amount of the photocurable resins.

(4) Step for Forming the Second Solid Electrolyte Layer

Figure 6:
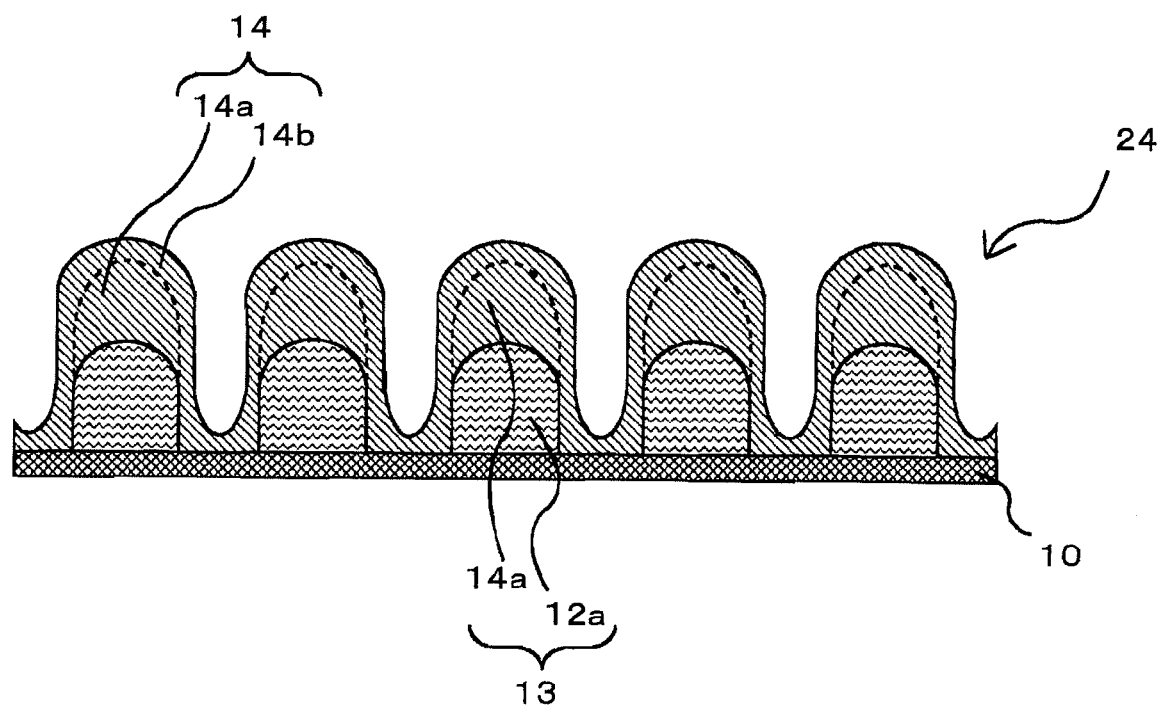
FIG. 6 is a schematic vertical sectional view showing the structure 24 of the second electrolyte layer 14b formed by applying the second electrolyte material to the whole of the linear active material-electrolyte part 13 and the spaces on the negative current collector 10 between the linear electrolyte parts 14a according to an embodiment of the present invention.

Next, the second electrolyte material which is the same as the first electrolyte material is applied to the whole of the linear negative electrode active material-electrolyte part 13 and the exposed spaces on the negative electrode current collector 10, as shown in FIG. 4, and thereby, the second electrolyte layer 14b is formed to form the solid electrolyte layer 14 composed of the linear electrolyte part 14a and the second electrolyte layer 14b, as shown in FIG. 6.

In this step, the formation method of the second electrolyte layer 14b is not particularly limited, and can be employed a conventional known method. It is preferable to form the solid electrolyte layer 14 by applying the second electrolyte material which is the same as the first electrolyte material to form the second electrolyte layer 14b.

Figure 7:
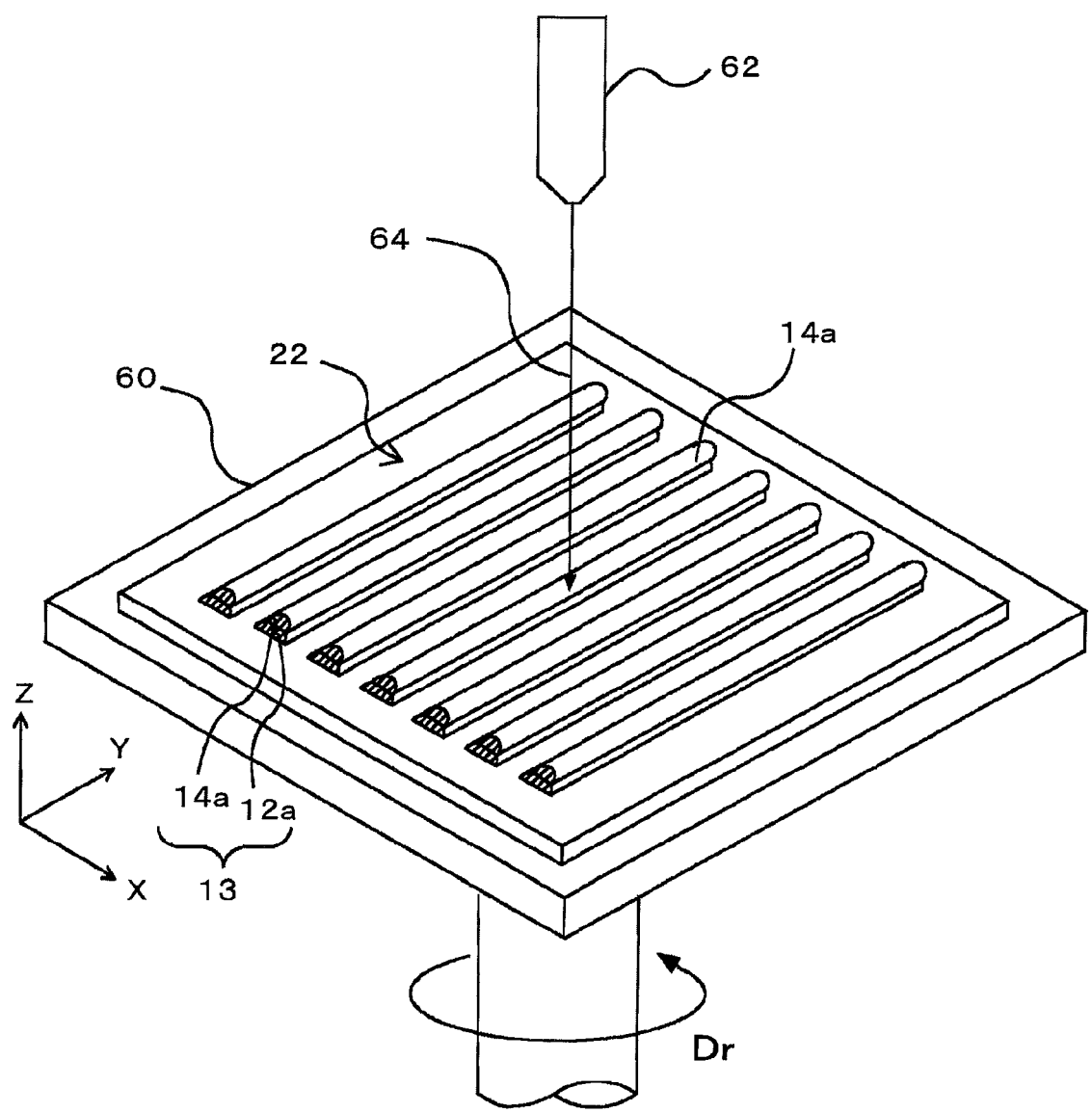
FIG. 7 is a diagrammatic view showing a manner that the second electrolyte layer 14b is formed by applying the second electrolyte material by spin coating method according to an embodiment of the present invention.

FIG. 7 is a diagrammatic view showing the manner where the second electrolyte material is applied by spin coating method. As shown in FIG. 7, the structure 22 (structure 22 having the linear negative electrode active material-electrolyte part 13) has, on the negative electrode current collector 10, the linear negative electrode active material part 12a which composes the negative electrode active material layer 12 and the linear electrolyte part 14a formed thereon. The structure 22 is set approximately horizontally (in the Z direction) on a spinning stage 60 which can spin freely in the given spinning direction Dr around a vertical spinning axis.

According to this embodiment, the solid electrolyte layer 14 is formed by setting the structure 22 having, on the sheet-like negative electrode current collector 10, the linear negative electrode active material part 12a and linear electrolyte part 14a formed thereon, on the spinning stage 60, and then the second electrolyte layer 14b is formed.

When the spinning stage 60 begins to spin at a given spinning rate, the paste-like coating liquid of the second electrolyte material 64 is discharged to a negative electrode 20 from nozzle 62 which provided at a position above the spinning axis of the spinning stage 60. The second electrolyte material dropped on the upper surface of the linear negative electrode active material-electrolyte part 13 spreads gradually to circumferential area by the centrifugal force due to spinning of the spinning stage 60, and an excess of the second electrolyte material is spin out from the edge of the linear negative electrode active material-electrolyte part 13.

According to this mechanism, the upper surface of the linear negative electrode active material-electrolyte part 13 is covered with the second electrolyte material thinly and uniformly. Subsequently by drying and solidifying the second electrolyte material film, the second electrolyte layer 14b is formed, which results in formation of the solid electrolyte layer 14 composed of the linear electrolyte part 14a and the second electrolyte layer 14b. The composition, viscosity, solid content of the second electrolyte material and the drying condition can be selected optionally according to conventional manners unless the effects of the invention are impaired.

According to the spin coating method, the film thickness of the solid electrolyte layer 14 can be controlled by regulating the viscosity of the second electrolyte material and the spinning rate of the spinning stage 60, and also, with respect to an article having convexity and concavity to be coated such as the linear negative electrode active material-electrolyte part 13, the thin and uniform second electrolyte layer 14b can be formed along the concavo-convex profile.

The thickness of the solid electrolyte layer 14 is not particularly limited, and may be, optionally, a thickness that the negative electrode active material layer 12 and the positive electrode active material layer 16 are exactly separated and does not increase an internal resistance too high. Also, when carrying out the solid electrolyte layer forming step, as mentioned above, the second electrolyte layer 14b may be photo-cured at the same time of its formation.

(3) Positive Electrode

The preparation process of the positive electrode active material layer 16 on the upper surface of the integrated structure 24 (see FIG. 6) prepared by integrating the negative electrode current collector 10, the negative electrode active material and the solid electrolyte layer 14 is not particularly limited and may be employed a conventional process. In this embodiment, the positive electrode active material layer 16 is formed by applying the paste-like positive electrode active material, for example, by doctor blade method, as shown in FIG. 8.

As the positive electrode active material, there can be used a mixture by kneading the positive electrode active material, electrically conductive aid, binder and solvent. The composition, viscosity, solid content of the positive electrode active material and the drying condition can be selected optionally according to conventional manners unless the effects of the invention are impaired.

Figure 8:
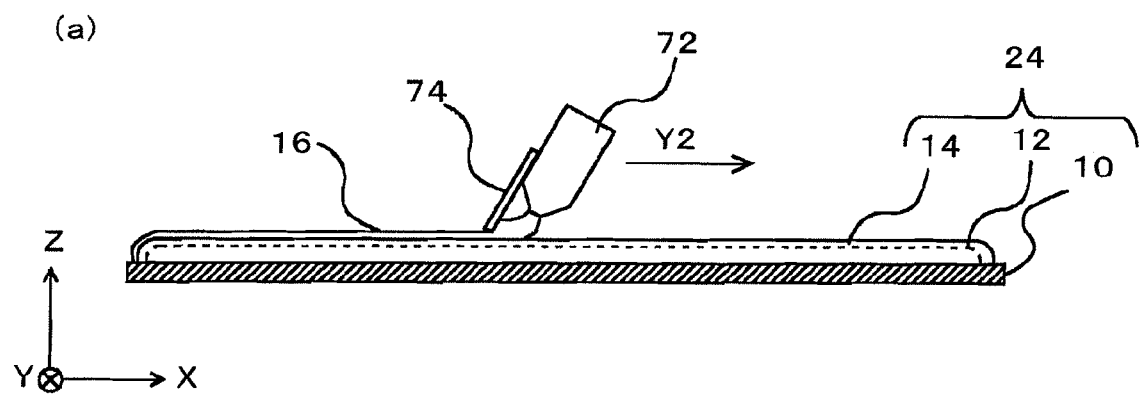
FIG. 8 is a diagrammatic view showing the positive electrode active material layer 16 is formed by using doctor blade method according to an embodiment of the present invention.
Figure 8:
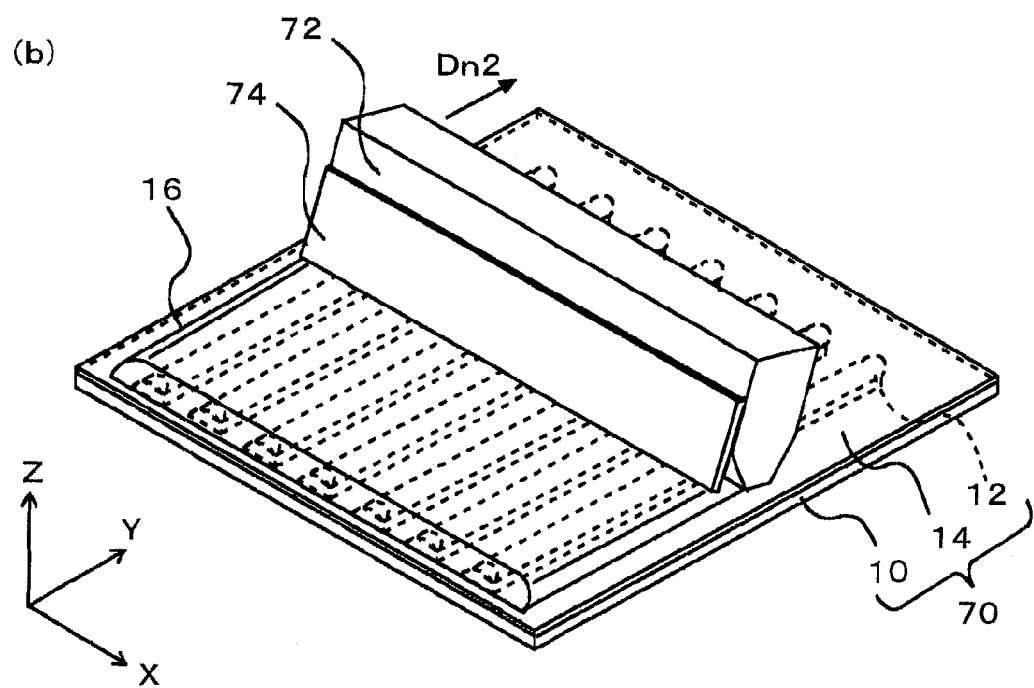

FIG. 8 is a diagrammatic view showing the mariner that the positive electrode active material is applied by doctor blade method. FIG. 8(a) is a diagrammatic side view to show the manner that the positive electrode active material is applied on the upper surface of the structure 24 by doctor blade method to form the positive electrode active material layer 16 (that is, a view in the direction being parallel to the main surface of the negative electrode current collector 10 having the negative electrode active material layer 12). FIG. 8(b) is a diagrammatic perspective view to show the manner that the positive electrode active material is applied to form the positive electrode active material layer 16.

A nozzle 72 to discharge the positive electrode active material is scanned and moved in the direction of the allow $Y_2$ with respect to the structure 24. A doctor blade 74 is provided with the nozzle 72 in the downstream of the allow $Y_2$. Since the lower edge of the doctor blade 74 contact the upper surface of the discharged positive electrode active material at a position above the solid electrolyte layer 14 formed on an integrated structure 70, the positive electrode active material layer 16 having a flat surface can be obtained.

The nozzle 72 used in this step may be a nozzle having many discharging nozzles such as the first nozzle 40 shown in FIG. 3, or may be a nozzle having a slit-like discharging opening which extends in the direction of the allow X (transverse to the moving direction of the allow $Y_2$).

By applying the positive electrode active material to the structure 24, the positive electrode active material layer 16 having the concavo-convex lower surface along the concavo-convex profile of the solid electrolyte layer 14 and the approximately flat upper surface can be prepared on the upper surface of the structure 24.

By integrating the positive electrode current collector 18 to the upper surface of the positive electrode active material layer 16 prepared as above, the lithium ion secondary battery 1 of the embodiment having the structure shown in FIG. 1 can be obtained. The positive electrode current collector 18 may be a conventionally known material, and may be a metal foil such as aluminum foil.

At that time, it is preferable that the positive electrode current collector 18 is integrated before the positive electrode active material layer 16 has not yet been solidified, because the positive electrode active material layer 16 and the positive electrode current collector 18 can be adhered tightly with each other. In addition, since the upper surface of the positive electrode active material layer 16 is approximately flat, the positive electrode current collector 18 can be integrated without any gap.

The present invention is not limited to the embodiment explained above. For example, though the drying step is carried out by blowing in the embodiment, the drying step may be carried out by natural drying or under vacuum.

In the present invention, many modifications can be done. For example, an application method used in each step is not limited to the aforementioned method, any other application step may be employed if it is suitable to those steps.

For example, though, in the above embodiment, the second electrolyte layer 14b is formed by forming the linear electrolyte part 14a on each of a plural of the linear negative electrode active material parts 12a which compose the negative electrode active material layer 12, and then covering the whole thereof, the second electrolyte layer may be formed by forming the linear electrolyte part on each of a plural of the linear positive electrode active material parts which compose the positive electrode active material layer, and then covering the whole thereof.

For example, though, in the above embodiment, the second electrolyte layer 14b is formed by spin coating method, the second electrolyte material may be applied by any other application method such as splay coating method, even if it can form a thin film following the convexity and concavity of the article to be coated.

Moreover, for example, though, in the above embodiment, the positive electrode active material layer 16 is formed by doctor blade method, there can be employed any method to provide a positive electrode active material layer having a lower surface following the convexity and concavity of the article to be coated and an approximately flat upper surface. This application manner can be obtained by using a positive electrode active material having a relatively not high viscosity. In other words, if a viscosity of the positive electrode active material is properly selected, it is possible to finish the lower surface concavo-convex and the upper surface approximately flat without employing doctor blade method, and other application methods such as nozzle dispense method, slit coating method and bar coating method can be employed.

What is claimed is:

1. A process for preparing an all-solid battery, comprising the steps of:

forming a linear active material part by relatively moving a first nozzle which discharges an active material linearly with respect to a current collector to form a plurality of linear active material parts on the current collector, with spaces between each adjacent pair of said linear active material parts, forming a first electrolyte layer by relatively moving a second nozzle which discharges a first electrolyte material with respect to the current collector to apply the first electrolyte material to each of the plurality of the linear active material parts to form a respective linear electrolyte part thereon while maintaining said spaces therebetween, thereby to prepare a plurality of linear active material-electrolyte parts, photo-curing by irradiating light to the linear electrolyte parts to cure the same, and forming a second electrolyte layer by applying a second electrolyte material to the whole of the linear active material-electrolyte parts and to said spaces on the current collector between the linear active material-electrolyte parts to prepare said second electrolyte layer.

2. The process for preparing an all-solid battery of claim 1, wherein the photo-curing step is carried out while conducting the step of forming the first electrolyte layer.

3. The process for preparing an all-solid battery of claim 1, wherein the first electrolyte material and the second electrolyte material are the same.

4. The process for preparing an all-solid battery of claim 1, wherein the step of forming the second electrolyte layer is carried out by spray method or spin-coat method.

* * * * *